US006820062B1

(12) United States Patent
Gupta et al.

(10) Patent No.: US 6,820,062 B1
(45) Date of Patent: Nov. 16, 2004

(54) PRODUCT INFORMATION SYSTEM (75) Inventors: Om P. Gupta, Ithaca, NY (US); Robert C. Ricketson, Ithaca, NY (US); Jack F. Bailey, Endwell, NY (US); Carol C. Shilepsky, Aurora, NY (US); Arnold C. Shilepsky, Aurora, NY (US)

(73) Assignee: Digicomp Research Corporation, Ithaca, NY (US)

( * ) Notice: Subject to any disclaimer, the term of this patent is extended or adjusted under 35 U.S.C. 154(b) by 0 days.

(21) Appl. No.: 07/878,100

(22) Filed: May 4, 1992

Related U.S. Application Data (63) Continuation-in-part of application No. 07/747,727, filed on Aug. 20, 1991.

(51) Int. Cl.[7] .............................................. G06F 14/30

(52) U.S. Cl. ......................................................... 705/16

(58) Field of Search ................................ 364/400, 401, 364/405; 235/431, 383, 385; 186/62, 61; 705/14, 16, 17, 18, 19, 20, 21, 22, 23, 24, 25, 26, 27

(56) References Cited

U.S. PATENT DOCUMENTS

| 4,071,740 A | * | 1/1978 | Gogulski ..................... 235/431 |
| 4,373,133 A | * | 2/1983 | Clyne et al. ................. 235/383 |
| 4,569,421 A | | 2/1986 | Sandstedt .................... 297/316 |
| 4,750,151 A | | 6/1988 | Baus ........................... 364/400 |
| 4,825,045 A | * | 4/1989 | Humble ....................... 235/383 |
| 4,833,308 A | | 5/1989 | Humble ....................... 235/383 |
| 4,850,009 A | * | 7/1989 | Zook et al. ............... 379/93.17 |
| 4,882,724 A | * | 11/1989 | Vela et al. ................... 364/401 |
| 4,888,709 A | * | 12/1989 | Revesz et al. ............... 364/518 |

(List continued on next page.)

FOREIGN PATENT DOCUMENTS

| EP | 0 245 569 | | 11/1978 |
| EP | 0 167 072 | | 1/1986 |
| EP | 0170194 | * | 2/1986 |
| EP | 0 176 959 | | 4/1986 |
| EP | 0 374 877 | | 12/1990 |
| EP | WO 91/14984 | | 10/1991 |
| ZA | 854821 | | 6/1985 |
| ZA | 855736 | | 7/1985 |
| ZA | 857538 | | 9/1985 |

OTHER PUBLICATIONS

Author Unknown—"Dynamic Shop Control System", Automation—Oct. 1969, pp. 23–24.*
Author: Lynn A. Yeazel—"Pioneering Perspective", Optical Info. Sys. , vol. 6, No. 1, Jan./Feb. 1986, pp. 36–37.*
Author Unknown—"ADS on Wheels Roll into Supermarkets", Chain Store Age Exec., vol. 64, No. 9, pp. 49 & 51.*

*Primary Examiner*—James P. Trammell
*Assistant Examiner*—Pierre E Elisca
(74) *Attorney, Agent, or Firm*—Brown & Michaels PC (57) ABSTRACT

The present invention features a Product Information System (PISYS) which presents advertising and product information to grocery shoppers. The system includes one or more shopping carts with a bar code scanner to read Universal Product Codes (UPCs) from merchandise. An artificial intelligence system presents advertising and general product information. The system determines the shopper's tastes from choices which the shopper expresses explicitly and from characterizations which it infers by examining the shopper's buying habits. When the shopping session is complete, the PISYS shopping cart transfers relevant information to a PISYS check-out counter, which transfers it directly to an in-house central computer. Because a PISYS shopping cart interacts with a shopper at the very moment he is making a purchase decision, it provides the most effective means for advertising. This data is analyzed by the in-house central computer, which provides accurate, timely measures of the effectiveness of any change in store strategy.

26 Claims, 5 Drawing Sheets

U.S. PATENT DOCUMENTS

| | | | | |
|---|---|---|---|---|
| 4,908,761 A | | 3/1990 | Tai | 364/401 |
| 4,916,441 A | * | 4/1990 | Gombrich | 345/169 |
| 4,929,819 A | | 5/1990 | Collins, Jr. | 235/383 |
| 4,973,952 A | * | 11/1990 | Malec et al. | 340/825.35 |
| 5,031,098 A | * | 7/1991 | Miller et al. | 705/21 |
| 5,056,019 A | * | 10/1991 | Schultz et al. | 364/405 |
| 5,083,638 A | * | 1/1992 | Schneider | 186/61 |
| 5,113,060 A | * | 5/1992 | Wike, Jr. et al. | 235/383 |
| 5,158,310 A | * | 10/1992 | Tannehill et al. | 280/33.992 |
| 5,202,825 A | * | 4/1993 | Miller et al. | 705/21 |
| 5,250,789 A | | 10/1993 | Johnsen | 235/383 |

\* cited by examiner

PRODUCT INFORMATION SYSTEM

RELATED APPLICATION

This application is a continuation-in-part of co-pending U.S. patent application, Ser. No. 07/747,727, filed on Aug. 20, 1991, by Om P. Gupta et al for "Product Information System for Shoppers". Priority is hereby claimed for the common subject matter shared between this application and its parent. The teachings previously described are meant to be incorporated into the present disclosure by way of reference.

BACKGROUND OF THE INVENTION

1. Field of the Invention

The present invention relates to grocery shopping cart processors and displays, and, more particularly, to such a device used to provide a shopper with product information correlated with the shopper's personal buying habits.

In the aforementioned, related patent application, a Product Information System (PISYS) for shoppers in a supermarket is presented. PISYS features an individualized computer (portable remote unit) mounted on each shopping cart. The remote unit includes a bar code scanner for allowing the shopper to scan the bar code labels on products. As a result, information is displayed, such as the product description, price, state and local taxes, food stamp eligibility, discount coupon eligibilities, nutrition information, etc.

The shopper can also keep a running total of the cost of the purchased items. If differences occur between the total shopping bill shown on the shopper's PISYS and the total tallied by the check-out clerk, the shopping list, prices and total costs from the PISYS can be downloaded to the check-out counter terminal using infrared communications. This provides an easy and timely resolution of the differences without inconveniencing other people waiting in the check-out line.

2. Discussion of Related Art

In U.S. Pat. No. 4,973,952, issued to Malec et al on Nov. 27, 1990 for "Shopping Cart Display System", a shopping system for advertising products to shoppers is illustrated. The display system in each cart is triggered by transmitters located in each aisle. The Malec system presents an advertisement when a potential shopper is physically close to a product, regardless of whether the shopper has a need for it. When the cart enters an aisle, the shopper is informed of special products located therein. For example, the Malec system may present a toothpaste advertisement whenever a shopper passes through the oral hygiene section of the store. The Malec system does not interact with the shopper, and advertising is not correlated with the buyer's own current product selections or buying habits.

It would be advantageous to display advertising material attuned to a shopper's specific interests at the exact, critical moment when the shopper is making a purchase decision and to bring coupon and special pricing information to the shopper's attention.

It would also be advantageous to provide a system to increase the overall unit volume of sales to each shopper by bringing the shopper's attention to products which are either more profitable or are not selling well.

It would further be advantageous to use real-time market information gleaned from each shopper's trip to measure advertising effectiveness, to refine advertising, pricing, packaging and shelf location strategies.

It would be advantageous to present both visual and audible cues in languages other than English.

It would also be advantageous to reduce advertising costs by eliminating the publication and distribution costs associated with print media.

SUMMARY OF THE INVENTION

In accordance with the present invention, there is provided an inference-based advertising and information system that is, in part, initiated by reading the Universal Product Code (UPC) bar codes found on most retail items.

The invention incorporates current purchase input data and special store promotions with an artificial intelligence (AI)-based shopper-interactive shopping system, using a computer carried on each shopper's shopping cart. It makes the shopping experience more productive and interesting and provides a platform for promoting products more effectively. Information related to the interest of the shopper in various products, obtained by the shopper's product bar code scanning, is used to selectively advertise competing and complementary products to the shopper at the time that he is making the decision to buy a product. Acquired and inferred knowledge about the shopper is combined with the shopper's proximity to advertisable competing or complementary products on other shelves, in order to further select the advertisements and information that will appear on the shopping cart display. The PISYS invention presents advertising copy for a carefully selected product not only when the shopper is close to an item, but also when the shopper expresses interest in it. Thus, PISYS intervenes at the exact moment when the shopper makes a product decision. PISYS presents ads which are attuned to the shopper's expressed interests. The shopper is likely to perceive such ads as a positive adjunct instead of a minor nuisance to be ignored. For example, a shopper scanning an item such as a soft drink might be shown advertisements for a competing soft drink, or even a store-generic soft drink. Such an advertisement selection could be based on the highest store margins or advertising/promotion fees paid by manufacturers and distributors. The system might also display complementary products such as nuts, chips and dips, in case the shopper has purchased beer or wine.

The system further defines the selection of advertisements according to the general interests of the shopper, and the shopper who uses food stamps is such an example. If a person questions the system repeatedly for information about food stamp eligibility of products, the system will not advertise expensive cheeses and wines. Furthermore, shopper cost sensitivity may be indicated if the system displays an advertisement for a competing lower-priced item that is subsequently purchased by the shopper.

The system maintains a Preference and Purchase Profile (PPP) for each customer. The PPP represents information about a shopper's interests and tastes, entered voluntarily the first time that the shopper uses the system. The PPP also contains a set of historical parameters which characterizes the shopper's buying habits over time. These range from statistical characterizations of product classes which a shopper purchases most frequently to a shopper's movement through the store.

Provisions may be made for each regular shopper to have a custom PPP stored in an in-house central computer and entered into the shopper's remote unit when the shopper enters the store. Information necessary to initiate this process could be stored on a store card given to the shopper and read with a card reader at the entrance to the store. Basic shopper information could be stored on the shopper's card and read by the scanner on the remote unit. Alternatively, the remote unit could be automatically initialized via infrared (IR) transmission with a shopper's PPP from the main computer at the time the shopper enters the store.

The remote unit keeps time-stamped lists of products scanned by the shopper, advertised to the shopper and purchased by the shopper. The lists can be downloaded to the central store computer via infrared communication to the check-out counter terminal at the time of check-out. An IR communication system between the check-out counter and shopping cart computer has been described in the aforementioned co-pending patent application. This list would be used to update a regular shopper's PPP on the main computer. Such a list could also be used to determine if the advertisement was effective in changing the decision of the buyer. The system measures effectiveness by tracking the time when the advertisement was displayed and the later moment when the item was added by the shopper to his shopping list. This information, downloaded to the in-house central computer, could be analyzed to determine the effectiveness of the advertising, as well as the billing of advertising fees to the manufacturers and/or distributors.

For example, the advertising fee structure could be based on a flat fee, plus the number of times an advertisement is displayed, plus the number of times the advertisement was effective in changing the mind of the shopper. Of course, different weights will be applied to the different factors discussed above. Automated billing software could easily be developed by anyone skilled in the art of software development.

Since the system described here could increase a store's profits considerably, such software could also calculate the profits that accrue to the store owner because of the use of such advertisement techniques. The software also could project what the profits would have been, if alternative advertising rules had been used. Furthermore, the output of this analysis software could be used to revise the rules governing advertising selection.

The remote unit described in the aforementioned co-pending patent application could be modified to include a larger graphic display. Advertisements could be stored on a video disk and indexed in a list. Several modifications can be incorporated in the software to include, at the shopper's request, functions such as the identification of aisles and shelves where various products are located. It can also be modified to keep a shopper-generated list of products and shelf prices, in case shelf prices are different from the check-out computer-stored prices.

The artificial intelligence software includes a rule-based inference engine that uses several related databases described in detail hereinbelow. Although the discussion hereinafter presented assumes that each remote unit has its own intelligent software running on its own individual computer, an alternative architecture is possible wherein each remote unit acts as a wireless terminal with intelligent software running on a central in-house computer.

BRIEF DESCRIPTION OF THE DRAWINGS

A complete understanding of the present invention may be obtained by reference to the accompanying drawings, considered in conjunction with the subsequent, detailed description, in which:

FIG. 3, separated for convenience into

DESCRIPTION OF THE PREFERRED EMBODIMENT

Figure 1:
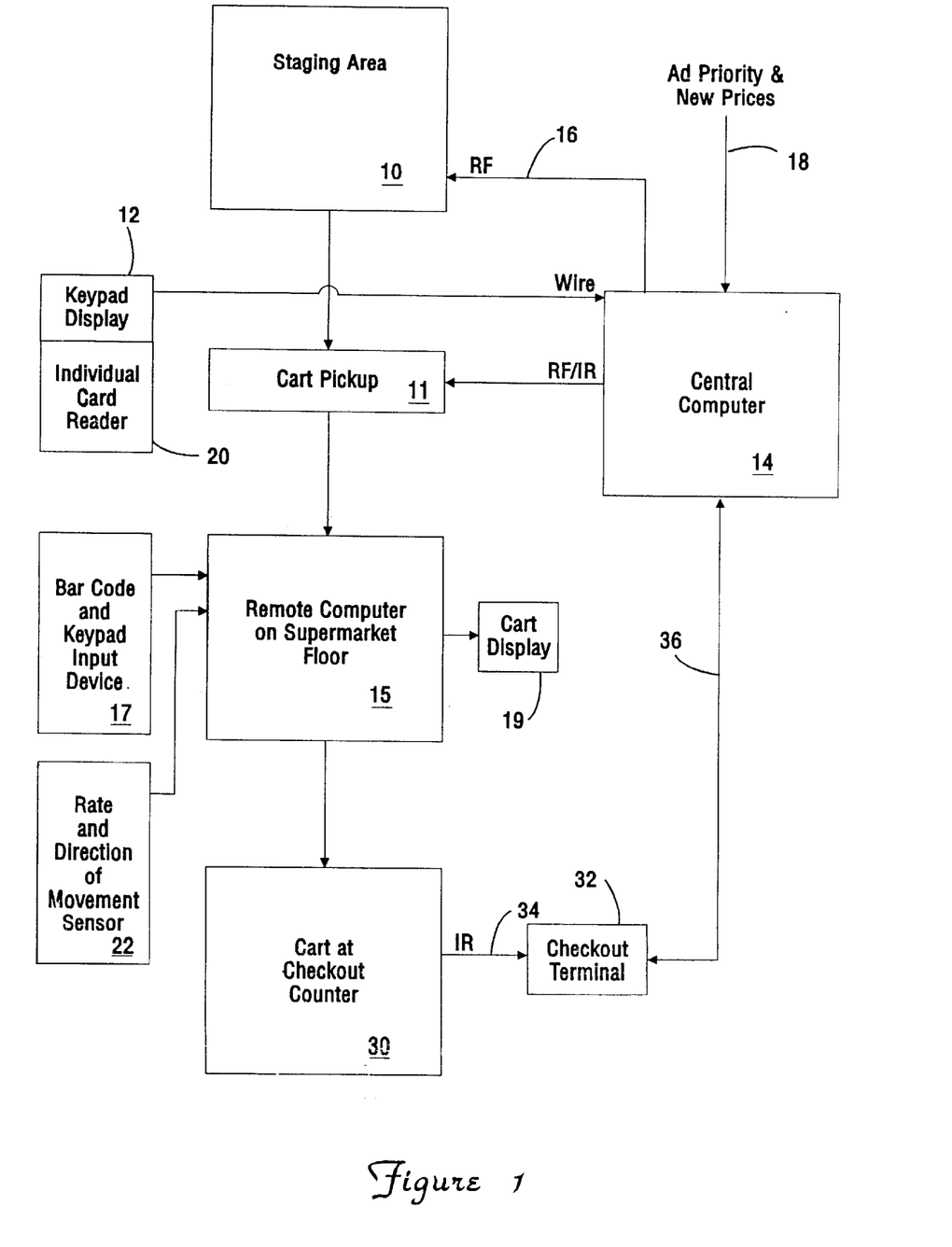
FIG. 1 is a block diagram depicting subsystem functions of the invention.

Referring now to FIG. 1, there is shown a block diagram of subsystems of the invention. A plurality of computerized PISYS shopping carts is normally located in a staging area 10. Each cart includes a bar code scanner and a display for presenting product information and advertising. Self-contained artificial intelligence software resides in a processor disposed in each cart. For purposes of this discussion, the terms "cart" and "shopping cart" refer to the physical cart maneuvered through supermarket aisles, as well as the processor, display and bar code reader associated therewith.

Each of the one or more PISYS staging areas 10, located either within the store or outside in a nearby parking lot, includes data transmission equipment for communicating with PISYS shopping carts docked within it and means for recharging the carts. Also provided in or near the staging area 10 is a magnetic card reader 20 with keypad/display 12.

An in-house central computer 14 is provided to maintain advertising and product information and to transfer such information continuously to carts in the staging area 10 via RF link 16. New or changed products and/or prices, as well as priority of advertisements, can be entered directly into central computer 14 via signal line 18, which represents a keyboard, modem, disk drive or any other suitable mechanism that can input data into a computer from a local or a remote location. Central computer 14 also maintains specialized databases for storing shopper interactions with individually computerized shopping carts. Central computer 14 also maintains time-of-day information used to synchronize shopping cart time. A valuable feature of central computer 14 is its capacity to store and execute artificial intelligence programs that analyze shopper demography and buying patterns, as described in greater detail hereinbelow.

Check-out counters 30 are provided with check-out terminals 32 which communicate with shopping carts over IR link 34 to download shopping cart logs (representing each shopper's trip through the store) to central computer 14 via suitable bidirectional communications link 36.

In operation, when a shopping cart is not in use, either store personnel or the shopper returns it to the staging area 10, where a charger maintains its battery condition. The staging area 10 also broadcasts the most recent product information and advertising data to the shopping carts docked within it, ensuring that all carts have current information. Time-stamp information from the in-house central computer 14 is also provided to the cart processor, ensuring that all shopping carts remain synchronized and providing an easy way to change from standard to daylight savings time and back again.

A shopper removes a shopping cart from staging area 10, as a first step 11. A shopper may manually enter a name or ID number through staging area keypad 12, or may use a magnetic check cashing card (sometimes called a "store club card") containing a personal identification code, by passing it through a card reader 20, which identifies the shopper to the in-house central computer 14. (Alternative mechanisms for identifying shoppers include voice recognition systems, fingerprint analyzers and signature recognition systems.) Card reader 20 resides proximate the staging area 10. In both cases, the in-house central computer 14 responds by RF/IR signal 16, sending the shopper's preference and purchase profile (PPP) characterizing the shopper's tastes and purchase patterns to the individual shopping cart computer database, not shown. If the shopper does not use a magnetic card and does not make a manual ID entry, the cart uses a default PPP.

Once the cart leaves the staging area 10, step 11, it disconnects from the staging area's battery charger. When the shopping cart is then with the shopper on the store floor, step 15, it contains everything it needs to interact with the shopper. Bar codes are read by a suitable device 17, such as one of the commercially available bar code readers. A cart display 19 presents product information and advertising. A touchscreen or keypad mechanism 17 allows manual key entry suitable for selecting items presented in menus on the cart's display 19. Alternative entry systems include key systems installed for convenience on the cart's push bar, or, as technology evolves, voice recognition systems. Practical display implementations include monochrome or color liquid crystal displays (LCDs). Such a display 19 is a practical means for presenting audiovisual advertising and prompting the shopper. A small audio amplifier and speaker provide a parallel method for presenting advertising copy and product information. The graphic display 19 has higher resolution than simpler character-based displays, allowing it to present continuous tone images (i.e., video images). The shopping cart also has a rate-of-movement sensor 22, which indicates how fast the cart is moving and a time-of-day clock, not shown. All operations are logged.

The heart of the inventive system is the intelligent software residing in the cart processor for monitoring the shopper's inputs. This AI software interacts with the shopper PPP loaded earlier to display product alternatives and advertising which best suit the shopper's buying patterns.

The system software logs all bar code scan activity, regardless of whether the shopper purchases a scanned item. (The interest which the shopper expresses by scanning even an item left unpurchased provides a measure of the effectiveness of product packaging, shelf location or nearby printed advertising.) When the shopper decides to purchase a product, he enters the product into the shopping list via keypad entry and the system updates the list of purchased items and total costs. It also generates subtotals by product class and tallies nutritional information associated with edible products. The system software also maintains time-stamped logs of its interactions with the shopper, and updates the shopper's PPP to reflect new or more accurate knowledge about the shopper's buying patterns.

Upon check-out, step 30, the shopping cart transmits all shopping session data via link 34 to the check-out terminal 32 or other device of the checkout counter. The cash register system may compare the list and prices of purchased items logged in the shopping cart computer to resolve any dispute between the customer and checkout clerk. All shopping cart shopping session data eventually passes to the in-house central computer 14 via link 36 for analysis.

The in-house central computer 14 updates its copy of each shopper PPP returned from the check-out counter 30. It also merges the shopping cart's logs with existing databases, developing the basis for further examination of generalized buying patterns. These are useful for determining the effectiveness of changes in product packaging and placement, as well as shopper response to poster advertising or other aspects of the store's floor layout. The in-house central computer 14 also tracks the effectiveness of each advertisement, which may affect the advertising rates billed back to vendors who pay for it.

The components within each subsystem appear in Table 1, and a summary of the operations which each subsystem performs appears in Table 2.

TABLE 1

Subsystem Elements

STAGING AREA

Database Broadcast Hardware
Battery Charger
Magnetic Card Reader for Entering Optional Customer ID
Keypad & Character Display for Keypad Feedback
SHOPPING CART Resources for Customer Input
   Manual Entry (Keyboard, Touch Screen, etc.)
   Bar Code Reader for Reading Product UPCs
Artificial Intelligence Software and Utilities
Databases for Inference Operations
   Customer Information
      Session History (Log of Shopper Interactions)
      Purchase and Preference Profile
   Product Information List
      Product Information
      Advertising Copy, Audio/Visual
      Recipes, Games, etc.
   Category Information
   Product Promotion List
Display and Sound Systems
Rate and Direction of Movement Sensor
Time Stamp Clock
CHECK-OUT COUNTER Communication Hardware
   Get Data from Carts
   Send Data to In-House Computer
Interface to Check-out Starburst Bar Code Reader
Purchase Verification Computer
IN-HOUSE COMPUTER Artificial Intelligence Software and Utilities
Databases Maintained for the Store's Customer Base
   Individual Shopper Cumulative Purchase Statistics
   Individual Shopper Profiles
   Master Advertising Presentation Log
   Master Purchase Selection Log
Database Maintenance Programs
Product Information Master File
Interface to Product Information
Advertising A/V Master File
Interface to Advertising Sources
Time Stamp Reference

TABLE 2

Subsystem Functions

SHOPPING CART

User Interface Operations
   Scan & Interpret Bar Codes
   Accept Other Manual Input
   Display Menus
   Display/Announce Product Alternatives
   Display/Announce Complementary Products
   Display/Announce Advertising
Inference Operations Select:
   Product Alternatives
   Complementary Products
   Advertising
   Product Information
Database Maintenance & Update
IN-HOUSE COMPUTER Database Maintenance of
   Individual Shopper Cumulative Purchase Statistics
   Individual Shopper Profiles

TABLE 2-continued

Subsystem Functions

Product Information Master File
    Advertising A/V Master File
  Artificial Intelligence Purchase and Shopper Analysis
  Get Data from External Resources
    New Product Information
    New Advertising A/V Material
  Send Data to PISYS Staging Area
    Product Information
    Advertising Material
    Individual User Profiles
CHECK-OUT COUNTER   Get Information from a Cart:
    Session History
    Updated Purchase and Preference Profile
    Advertisement Presentation Log
    Purchase Selection Log
  Send Information to In-House Computer:
    Inference History
    Updated User Profile
    Advertisement Presentation Log
    Purchase Selection Log
  Purchase Verification
STAGING AREA   Transfer Database from In-House Computer to Cart:
    Profile Loading
    Product Information
    Advertising Audio/Visual
  Battery Charging
  Identify Customer via Magnetic Card/Keypad (Optional)

Figure 2:
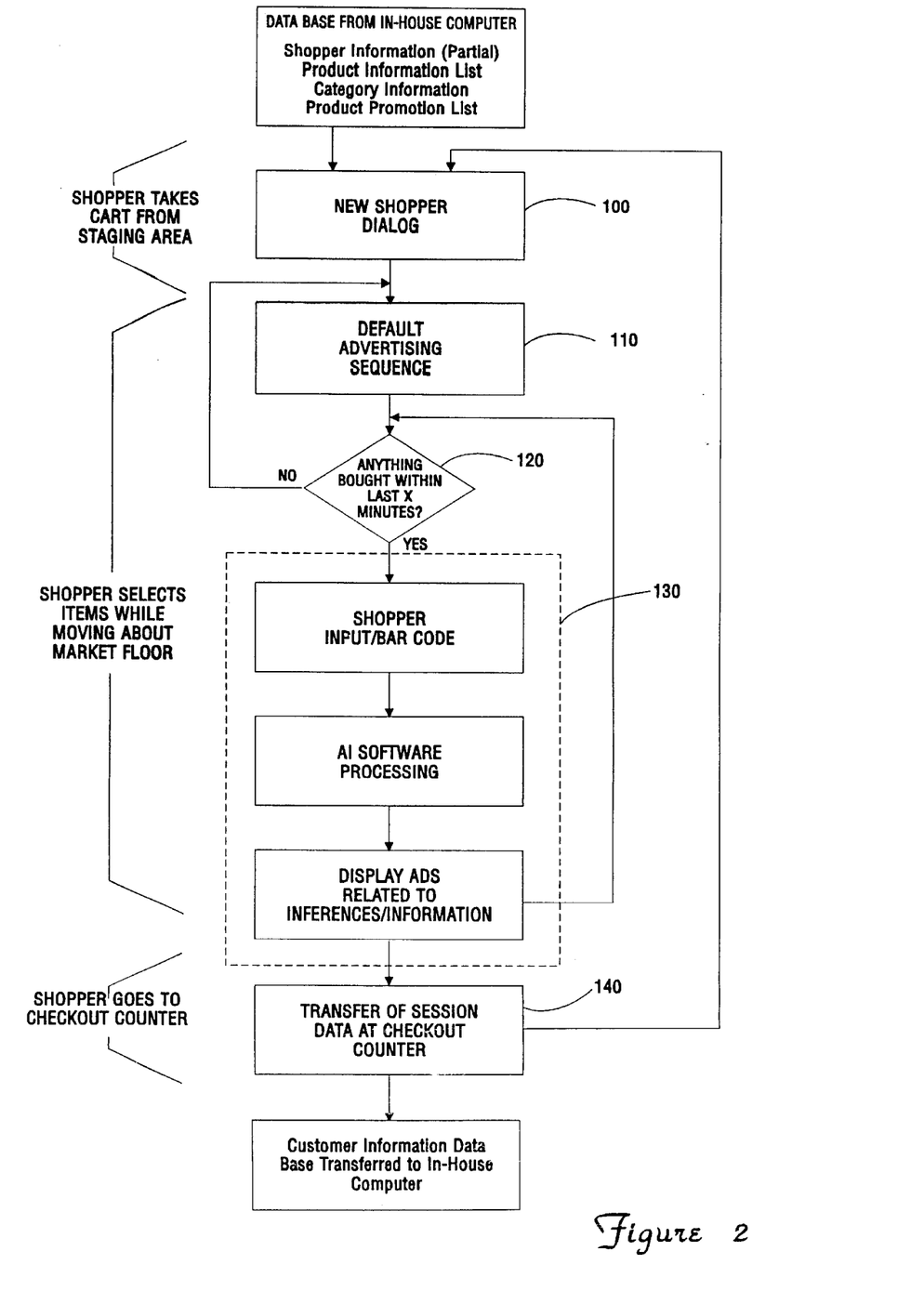
FIG. 2 is a top-level flow chart depicting shopping cart interactions with a shopper.

Referring now also to FIG. 2, there is shown a flow chart of shopping cart/shopper interactions. The shopping cart computer incorporates AI inference engine software using rule-based artificial intelligence to select items to be presented to the shopper. The inference engine uses several main database structures: (a) shopper information, (b) product information list, (c) category information, and (d) product promotion list.

Shopper information includes the shopper's preference and purchase profile. The shopper information data structure includes logs of all shopper activity during a single shopping trip.

The product information list describes each product in the store and includes audio/visual representations of advertising material, maintained in compressed form to reduce local data storage requirements. These multimedia structures are allowed to change at preset times of day, allowing the carts to simultaneously change advertising presentations and pricing throughout the day without being returned to the staging area 10 (FIG. 1) to be updated.

Category information indicates relationships between different groups of products.

The product promotion list indicates the promotional strategy to be used with each advertised product.

Provided in the cart processor for the AI inference engine could be a rule based system, which is responsible for characterizing the system's interpretation of customer inputs land controlling presentation of product information and advertising to the shopper. "Rules", as the term is used herein, constitute a wide variety of approaches, from rudimentary look-up tables of examples to intelligent, sophisticated, adaptive inferential neural networks or any other selection strategy or rule. The system intelligently provides the most appropriate information and paid advertisements, or, alternatively, information that is advantageous to the store. It might suggest complementary products as well (e.g., mustard for the hot dogs). Although the inference engine provides a default sequence for any situation which is incompletely specified, its usual operation relies on specific interactions with the shopper. The artificial intelligence software also maintains the databases, paying particular attention to the structures which characterize the shopper's habits and interests.

The "New Shopper Dialogue", step 100, may be as simple as the user entering a name or passing a magnetic store club card through reader 20 (FIG. 1), but it also allows a new shopper to enter items such as whether the shopper uses food stamps, is a vegetarian, or is on a restricted diet. The shopper also may select a language for the display that is different from the one dominant in a multilingual society. The shopper also may enter a shopping list, expressing the items sought during the ensuing trip through the supermarket. The information learned here and through subsequent interactions is stored for later use by shopping cart artificial intelligence software, which uses the data to make decisions about which advertising and product information displays are most appropriate. Some of the information is applied to the preference and purchase profile which characterizes each shopper's individual tastes and buying habits.

When the New Shopper Dialogue is complete, step 100, the shopping cart displays a "Default Advertising Sequence", step 110, until the shopper enters a first input. This is a series of advertisements, presented several seconds apart. Advertisements presented in the sequence depend on shopper attributes that have been entered earlier or inferred.

The system includes a watchdog timer, not shown, which is reset each time a product's UPC code is scanned or the keyboard 17 is used. If no shopping or selecting activity occurs within a predetermined amount of time (e.g., ten minutes), step 120, the Default Advertising Sequence continues.

Figure 3A:
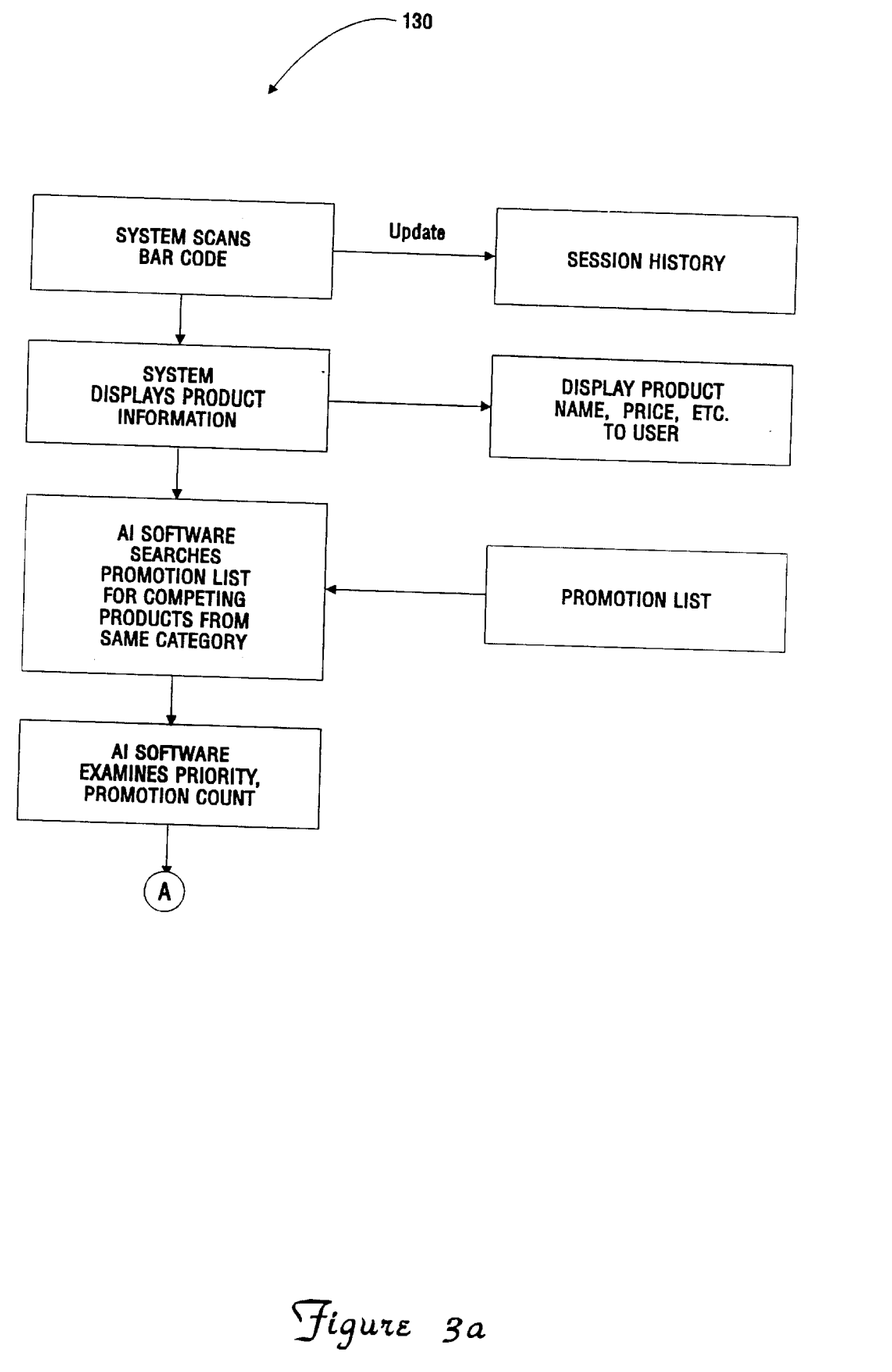
FIGS. 3a and 3b, is a flow chart depicting a portion of the interactions of FIG. 2 in greater detail.
Figure 3B:
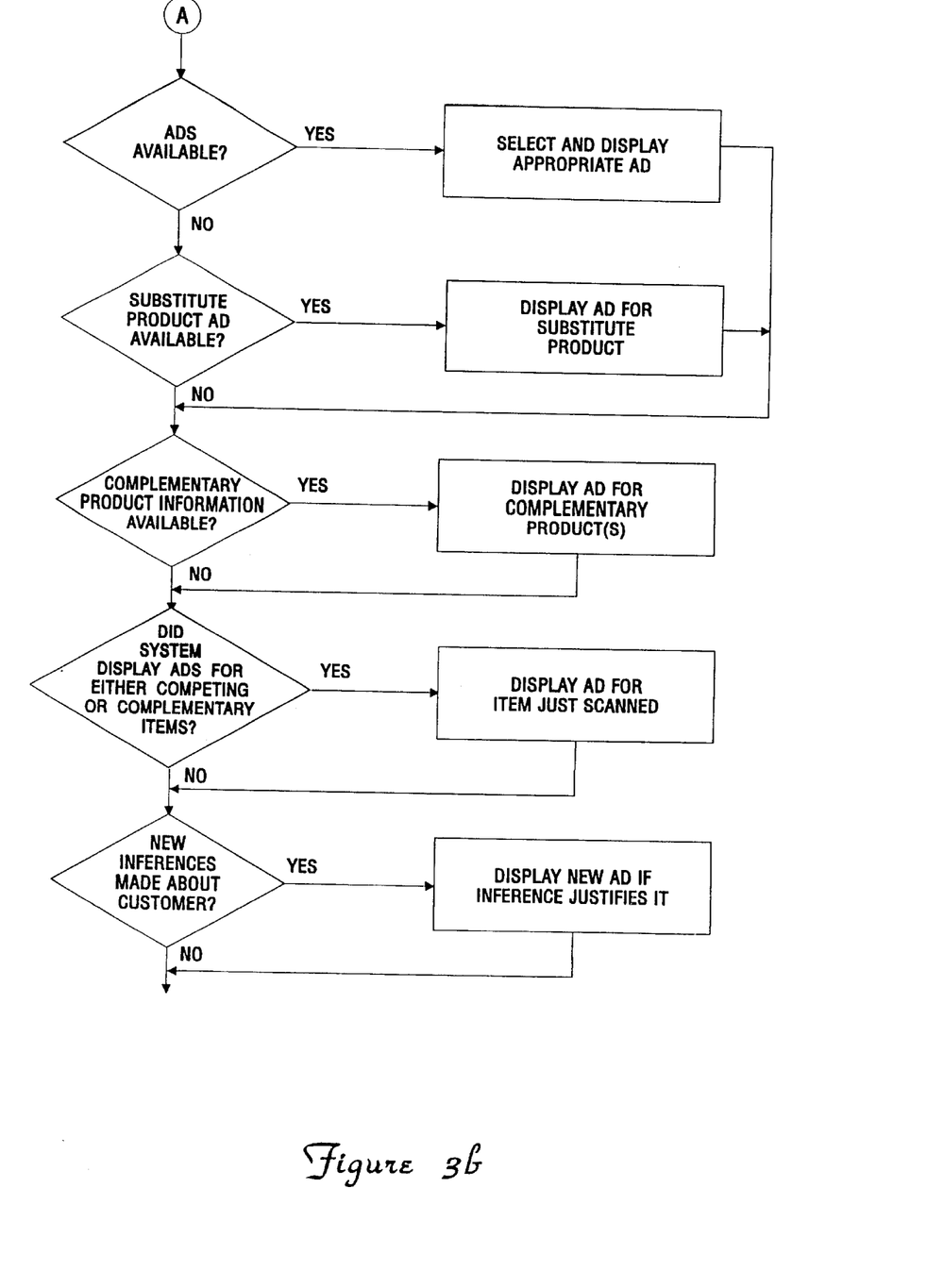

"Shopper Input", step 130, can interrupt the Default Advertising Sequence at any time. A detailed description of system operations from shopper input to display of appropriate message(s), step 130, is shown in FIG. 3, which should be referred to in conjunction with FIG. 2 at this point. Shopper input may be the scan of an item's bar code or a selection from a nested menu system. A few of many possible menu choices includes:
Locating an item in the store;
Finding the total of the purchases made;
Reviewing the list of purchases;
Selecting or de o-selecting an item for purchase;
Requesting related recipes or dietary information; and
Redisplaying the last advertisement.

The system software uses four major databases to respond to the shopper's needs, as shown below.

The shopper information database includes a complete time-stamped record of all shopper interactions with the shopping cart, accompanied by shopper attributes learned or inferred from the interactions. The two important information structures within each shopper information record are session history and the preference and purchase profile (PPP).

The session history field stores user interactions as they occur. Included in this time-stamped history are all bar code readings, every menu selection, user query, user response, purchases selected or de-selected, advertisements or product information displayed, and the shopper's path through the store, as indicated by items which were scanned and assisted by cart location signals, if available.

This information allows the central computer 14 to intelligently analyze the shopper's actions during the shopping session. This information is stored and combined with information from other shoppers to make improvements in both the store and the program's 'performances. The shopper's purchases may be reconstructed quickly from this list as needed, but a separate PURCHASES list might be maintained for program efficiency.

The second major field of this record is the shopper's preference and purchase profile, values for which were either established at some point by the shopper or inferred during program execution. Examples of shopper-supplied values include language choice for display (e.g., Spanish, French), food stamp user, gourmet shopper, international shopper, coupon user, vision- or hearing-impaired (changes the size of displays and level of audio), special diet, and store club member.

Some of these fields have subcategories. For example, the "international shopper" field includes a specification of a country or countries of interest, and the "special diet" field indicates that the shopper is vegetarian, needs a low- salt or sugar diet, has allergies to specific foodstuffs, or desires kosher foods. These values might be indicated through the "New Shopper Dialogue" menu selection, step 100 (FIG. 2). They also may be specified when the shopper fills out and submits a form to obtain a store club card. In either case, the information eventually passes to the in-house central computer database which maintains individual shopper PPPs. When engaging in a New Shopper Dialogue during a later shopping trip, the shopper need only identify himself with the store club card or an ID code, and the staging area 10 (FIG. 1) will load the shopper's PPP into the shopping cart automatically, as indicated earlier.

The PPP passed to the shopping cart also includes a set of values which the system develops and maintains during shopping activity. Some possible characterizations include date, time and length of shopping session, average rate of travel when in motion, percentage of time when cart is motionless (i.e., when the customer is likely to be examining products), average shelf dwell time (i.e., the average time that the shopper is standing still before a shelf), shelf dwells per unit time, percentage of shelf dwells which result in a scan, average cost of a scanned item, average cost of scanned items which were purchased, price sensitivity index, purchase distribution statistics, representing the proportion of each class of products the shopper scans or scans, and buys, and measures of the shopper's response to different types of advertising. The advertising might take the form(s) of visual presentations (character-based advertising vs. graphics), audio advertising, advertisement vs. a neutral list of product alternatives, or a presentation of complementary products.

These values provide useful ways to characterize the shopper. A shopper who is moving very quickly but erratically through the store may be unfamiliar with its layout and might appreciate an offer of help to find something. Another individual who moves fairly slowly between relatively long periods of motionlessness might be examining products closely but not using the system, and the system may respond in a way which involves the shopper. Shopper characterizations also provide a way to ascertain when someone other than the owner of the store club card uses it to gain access to PISYS. For example, when a spouse borrows the card, the program takes such attribute into account when selecting information and advertisement for presentation to the shopper.

The product information list is the basic database of products in the store. Some fields within the product information list are not accessible to the shopper but are useful to the rule-based software and analysis programs. Important fields of information include product name, size, bar code (UPC) value, manufacturer, category, location in the store, unit, unit price, volume breakpoint structure, price structure timing, applicability of state and local taxes, store wholesale cost, profit margin, nutritional information, and related recipes, cooking and storage information.

Most of these fields are self-explanatory and are part of the store's existing database. Some fields (such as nutritional information and price break structure) may be complex and highly mutable from product to product. The pricing structure can change with time, allowing the shopping cart to apply time-specific "specials" without further attention from the in-house central computer 14 (FIG. 1).

The category information database includes material about relationships between different groups of products that the rule base, hereinafter described, can use to make intelligent choices for displaying information and advertisements to the shopper. The software will allow for a more complicated taxonomy. In a simple example, the major fields related to the category structure might be category name, category number, complementary categories, substitute categories, default product, universal product code and related recipes, games, cooking and storage information.

The category name describes products such as hot dogs. It has an associated number for processing and indexing. Types of products that are bought with hot dogs, such as mustards, soft drinks or charcoal, represent items assigned to complementary categories. Foods that might be substituted for hot dogs (e.g., deli meats or ground beef) are located in substitute categories. The default product field contains the product in this category which should be promoted if the inference engine software identifies no others to be advertised.

The product promotion list includes a list of products to be promoted, ensuring that they are advertised to appropriate shoppers at the correct time. The major product promotion list fields for each promotable item are bar code (UPC), special promotion keys, priority level, number of times promoted and pointer to advertisement.

The bar code field contains the bar code value of the product to be promoted. It may also include bar codes of the same product in different sizes, or of other products which are somehow related to the present product and which could trigger the promotion of the present product.

Promotions could also be triggered by entries in the special promotion keys field, alone or in combination with bar code field information. This allows for scenarios such as advertising Pepsi whenever Coke is scanned, or advertising a new exotic item to gourmet shoppers. These keys and their associated rules are heavily interdependent.

The priority level and the number of times promoted fields are used to determine which of several competing ads should be displayed to the current shopper. The decision rests on a mixture of probabilistic and deterministic considerations, depending on the specific situation. For example, an advertiser might pay for an exclusive ad that is shown each time a particular category is scanned, or perhaps every third time, or even with a probability of 0.33 every time a shopper scans its category. In general, no advertisement is displayed twice to the same shopper, unless the shopper requests it.

The pointer to advertisement field contains information necessary to find and display the selected ad copy, which may be stored in any form of electronic memory or may be internally generated by the system software. For example, video disks can be used to store moving images for displaying animated advertisements. The ad copy could also be stored in different languages and an appropriate language for display selected based upon the information from the PPP file.

Once the shopper has reached the check-out counter 30 (FIG. 1), the session data is transferred from cart to check-out terminal 32 and thence to in-house central computer 14, as shown as step 140 (FIG. 2).

The shopping cart begins processing when: (a) the shopper scans a product; (b) the shopper requests or gives information; (c) an optional location signal is received; and/or (d) a time interval has elapsed.

Figure 4:
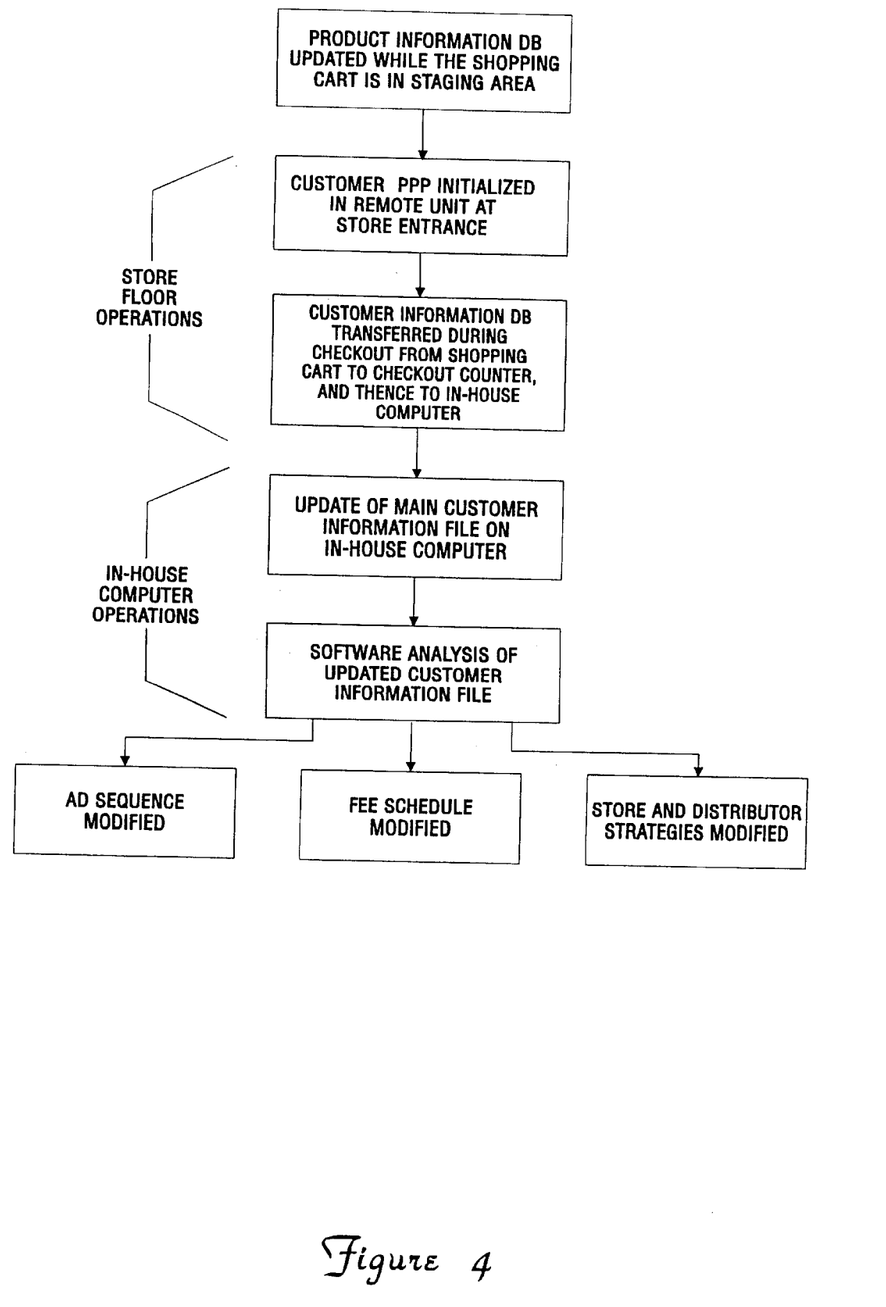
FIG. 4 is a flow chart depicting functions and operations between the cart computers and the central computer, in accordance with the present invention.

Each of these events or non-events triggers processing that determines the appropriate intelligent response. If the shopper scans a product or requests information, the shopping cart's software takes the actions indicated in FIG. 4, which depicts actions related to or performed by the in-house central computer 14 (FIG. 1).

To demonstrate the AI inference engine's sensitivity to user input, consider the following example of interactions between the shopping cart and a hypothetical shopper passing through the produce section of a supermarket. After the shopper removes a shopping cart from the staging area 10, a typical set of interactions might resemble the one appearing in Table 3.

TABLE 3

Sample Interactions

NEW SHOPPER DIALOGUE:

The user indicates he is a coupon user.
DEFAULT SEQUENCE triggered by elapsed time:

Reminder to buy Halloween candy for next week
USER INPUT:

Customer scans iceberg lettuce.
SYSTEM DISPLAY:

Information about iceberg lettuce
Special on Romaine lettuce (competitive product),
triggered in part because the system knows
that the shopper uses coupons and is
therefore sensitive to price
Ad for Kraft Olive Oil Italian Salad Dressing (a
complementary product)
USER INPUT:

User requests redisplay of previous ad for Romaine
lettuce
User scans Romaine lettuce
SYSTEM DISPLAY:

Information about Romaine lettuce
USER INPUT:

User selects Romaine lettuce for purchase
SYSTEM DISPLAY:

Since the system knows that the customer has
already investigated iceberg lettuce, the system
does not mention it again.
Ad for Pepperidge Farms Garlic Croutons (a
complementary product commonly used with Romaine
lettuce salads)
USER INPUT:

User scans Mueller's Spaghetti
SYSTEM DISPLAY:

Information about Mueller's Spaghetti
Information about store brand spaghetti (the
default competitive product)

TABLE 3-continued

Sample Interactions

Ad for Hunt's Tomato Sauce (a complementary
product)
Coupon offer on Progresso Olive Oil (a coupon item
at the same location as the spaghetti)
USER INPUT:

User scans bagels
SYSTEM DISPLAY:

Information about bagels
Ads for Vita Cream Cheese and Vita Smoked Salmon
(a special promotion for all customers who scan
bagels, cream cheese or smoked salmon)

Table 3 shows only a few of the adaptations which an AI inference engine can decide upon. It also adapts to measures of a shopper's sensitivity to product price. If a shopper consistently scans the lowest cost item in each product category, the inference engine can recommend store brands of equal quality but lower price. However, it might lessen its emphasis on store brands if the shopper shows the purchase patterns of a less budget-conscious gourmet, who might feel that a highly visible display of lower-cost store brands has little value.

All of the shopper information database eventually passes to the in-house central computer 14. There is a possibility of arguments between the customer and the checkout clerk at the checkout counter if there are discrepancies between the cost totals shown on the cart and checkout terminal. The stream of bar codes from the check-out terminal 32 is compared to the list of purchases which the shopping cart transferred to it. A log of discrepancies is then generated and problems are resolved quickly without inconveniencing other customers waiting in the checkout line.

Most important to store managers and advertisers are master databases representing shopper activity. As mentioned above, the shopper information database for each customer arrives from the check-out counter 30, containing a session history log and a preference and purchase profile. Because these include a list of all bar code scans and a record of the shopping cart's rate of travel, utility programs may partially reconstruct the shopper's path through the store. Much can be inferred about the shopper's interests by examining the log of user queries.

These in-house central computer utilities merge parts of each shopping session's shopper information database (and inferences extracted from it) into a set of aggregate databases, which include individual shopper cumulative purchase statistics, individual shopper profiles, master advertising presentation log and master purchase selection log.

Utility programs also examine the databases to determine how effective advertising is. If the store manager or advertiser makes a change in the advertising copy, the product price structure, or the product's location and presentation within the store, utility programs provide fast, accurate measures of the change's effectiveness.

Because the in-house central computer logs each shopper's visit, utilities can also provide demographic characterizations of a store's shopper base, revealing rates at which various groups patronize it. This is useful for determining promotional policies to be used with other advertising resources, such as newspapers or direct mail.

Other utilities can maintain demographic timelines, normalizing them to remove fluctuations due to confounding factors such as weather or annual purchase cycles. These show long-term trends in shopper interest. A sudden change in a specific category can reveal when part of the store's shopper base has been eroded by a competitor's targeted advertising.

Utility programs also handle billing for advertising services. Invoices optionally list indices of each advertisement's effectiveness, another valuable resource that the store provides to advertisers.

Since the system described here could increase a store's profits considerably, its owners would like to be sure that the rules it uses to select advertisements are tuned effectively. Software could be generated which explains to a store owner the details of the PISYS rules base. This could be done using techniques such as those used in MYCIN (a medical diagnosis expert system) and its knowledge base editor, Teiresias. (See "Artificial Intelligence and the Design of Expert Systems", by George F. Luger and William A. Stubblefield, Benjamin/Cummings, 1989, pp. 324–331.) Such software could also calculate the profits (e.g., the additional profits generated by advertising higher margin items) that accrue to the store owner because of the use of such advertisement technique. The software also could project what the profits would have been if alternate advertising rules were used. Furthermore, the output of this analysis software could be used to revise rules for selecting the advertising, and the whole system could be a "living system."

Since other modifications and changes varied to fit particular operating requirements and environments will be, apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A system for promoting the sale of products to a customer at a location remote from any checkout counter, comprising
   a) at least one portable unit which is operable remote from any checkout counter, said portable unit comprising:
      i) a data entry device for inputting identification of a product desired by a customer; and
      ii) a data output device for displaying information to the customer;
   b) means for accessing stored data representative of said product identification;
   c) means for accessing stored product specifications;
   d) a processor in communication with said data entry device for inputting product identification, with said means for accessing stored data representative of said product identification, with said means for accessing stored product specifications, and with said data output device, wherein said processor is programmed to select said identified product, a competing product to said identified product or a complimentary product to said identified product for promotion based upon rules for selecting a product for promotion in response to said stored data representative of said product identification input on said data entry device wherein said processor accesses said stored product specifications and promotes a product by displaying on said data output device said stored product specifications of said product selected for promotion to said customer,
wherein said promoting the sale of products to a customer occurs prior to the customer reaching any checkout counter or point of sale.

2. The system for promoting the sale of products in accordance with claim 1, wherein said rules for selecting a product for promotion operate in response to said customer's position.

3. The system for promoting the sale of products in accordance with claim 2, wherein said rules comprise said customer's position.

4. The system for promoting the sale of products in accordance with claim 1, wherein said means for inputting product identification comprises a bar code scanner, under control of said customer, for scanning a universal price code.

5. The system for promoting the sale of products in accordance with claim 1, wherein said means for inputting product identification comprises a keypad.

6. The system for promoting the sale of products in accordance with claim 1, wherein said means for inputting product identification comprises a voice recognition subsystem.

7. The system for promoting the sale of products in accordance with claim 1, wherein said processing means for promoting a product comprises means for generating a visual promotional message.

8. The system for promoting the sale of products in accordance with claim 1, wherein said processing means for promoting a product comprises means for generating an audible promotional message.

9. The system for promoting the sale of products in accordance with claim 1, wherein data representative of said customer's purchasing interests, items purchased, and promotional messages presented are stored in chronological order.

10. The system for promoting the sale of products in accordance with claim 1, further comprising:
    f) means for providing a retail establishment with: customer buying habits, current product sales, a running inventory of product purchases, information for billing advertisers, and traffic patterns of customers traversing said retail establishment; and
    g) means for supplying information to individual customers about products corresponding to their current or cumulative purchases.

11. The system for promoting the sale of products in accordance with claim 10, wherein said elements (f) and (g) comprise a central computer having a data bank for keeping inventory records, a current file of product information, and a historical file of purchased items for each customer traversing said retail establishment.

12. The system for promoting the sale of products in accordance with claim 11, wherein said central computer is adapted to execute programs for:
    i) supplying current product information to said at least one remote unit in response to information provided by said customer in control of said at least one remote unit; and
    ii) providing historical data relating to said customer's buying habits in response to requests for such information from said customer in control of said at least one remote unit.

13. The system for promoting the sale of products in accordance with claim 12, wherein said elements (e) and (f) are in communicative relationship by a infrared communication link.

14. The system for promoting the sale of products in accordance with claim 12, further comprising means for analyzing said running inventory of product purchases and said information for billing advertisers in order to determine the effectiveness of advertising and in order to bill advertisers appropriately.

15. The system for promoting the sale of products in accordance with claim 12, wherein said elements (e) and (f) are in communicative relationship by an radio frequency communication link.

16. The system for promoting the sale of products in accordance with claim 11, wherein said rules for selecting a product for promotion operate in response to the information in the historical file about products corresponding to the customer's cumulative purchases.

17. The system for promoting the sale of products in accordance with claim 1, wherein said rules for selecting a product for promotion operate in response to price differences between said identified product and competing products.

18. The system for promoting the sale of products in accordance with claim 17, wherein said rules for selecting a product for promotion operate to promote a lower priced competing product to said customer.

19. The system for promoting the sale of products in accordance with claim 17, wherein said rules for selecting a product for promotion operate to promote a competing product to said customer that provides a higher profit for an establishment offering said identified product and said competing product for sale.

20. The system for promoting the sale of products in accordance with claim 1, wherein said rules for selecting a product for promotion operate in response to a list of products that advertisers have selected for promotion.

21. A method of displaying promotions for the sale of products to a customer at a location remote from any checkout counter, comprising the steps of:
   a) selecting a portable unit to provide to said customer, wherein said portable unit is operable remote from any checkout counter and said portable unit comprises a display, and a data entry device for inputting identification of a product desired by said customer,
   b) providing means for accessing stored data representative of said product identification, means for accessing stored product specifications, and a processor for controlling the operation of said portable unit wherein said processor is in communication with said data entry device for inputting product identification, to said means for accessing stored data representative of said product identification and to said means for accessing stored product specifications;
   c) programming said processor with operational instructions and rules for selecting said identified product, a competing product to said identified product, or a complimentary product to said identified product for promotion in response to said stored data representative of said product identification when said customer inputs said product identification on the data entry device such that said processor accesses said stored product specifications and promotes a product by displaying said stored product specifications of said product selected for promotion to said customer; and
   d) providing said programmed portable unit to said customer for use by said customer at a location remote from any checkout counter as said customer selects products for purchase,
wherein said displaying promotions for the sale of products to a customer occurs prior to the customer reaching any checkout counter or point of sale.

22. The method of displaying promotions for the sale of products to a customer of claim 21, wherein said rules for selecting a product for promotion operate in response to price differences between said identified product and competing products.

23. The method of displaying promotions for the sale of products to a customer of claim 22, wherein said rules for selecting a product for promotion operate to promote a lower priced competing product to said customer.

24. The method of displaying promotions for the sale of products to a customer of claim 22, wherein said rules for selecting a product for promotion operate to promote a competing product to said customer that provides a higher profit for an establishment offering said identified product and said competing product for sale.

25. The method of displaying promotions for the sale of products to a customer of claim 21, wherein said rules for selecting a product for promotion operate in response to a list of products that advertisers have selected for promotion.

26. The method of displaying promotions for the sale of products to a customer of claim 21, wherein remote units are provided with stored information about said customer's product purchase history and said rules for selecting a product for promotion operate in response to said information about said customer's product purchase history.

* * * * *